(12) United States Patent
Hustyi et al.

(10) Patent No.: US 8,414,066 B2
(45) Date of Patent: Apr. 9, 2013

(54) REINFORCED VEHICLE STRUCTURE

(75) Inventors: Dan Hustyi, Waterford, MI (US); Brian Shepard, Ypsilanti, MI (US); Emily Hospodar, Berkley, MI (US); Robert Blanchard, Fenton, MI (US)

(73) Assignee: Nissan North America, Inc., Franklin, TN (US)

( * ) Notice: Subject to any disclaimer, the term of this patent is extended or adjusted under 35 U.S.C. 154(b) by 254 days.

(21) Appl. No.: 13/035,562

(22) Filed: Feb. 25, 2011

(65) Prior Publication Data

US 2012/0217769 A1    Aug. 30, 2012

(51) Int. Cl.
*B60J 7/00*    (2006.01)

(52) U.S. Cl. .................................................. 296/193.01

(58) Field of Classification Search ............. 296/193.01, 296/146.6, 187.02, 187.12, 191, 190.11, 296/193.06, 193.07, 203.01, 203.03, 204, 296/205, 210; 180/89.1; 211/98.8; 280/781; 29/897.2
See application file for complete search history.

(56) References Cited

U.S. PATENT DOCUMENTS

| | | | | |
|---|---|---|---|---|
| 3,917,338 | A |   | 11/1975 | Becker |
| 3,948,340 | A | * | 4/1976 | Breitschwerdt .............. 180/89.1 |
| 5,102,187 | A | * | 4/1992 | Harasaki ....................... 296/204 |
| 5,482,348 | A | * | 1/1996 | Mass et al. .................... 296/207 |
| 5,500,985 | A | * | 3/1996 | Klueger ........................... 16/354 |
| 5,542,777 | A | * | 8/1996 | Johnson ......................... 403/389 |
| 5,642,563 | A | * | 7/1997 | Bonnett ........................... 29/771 |
| 5,921,618 | A | * | 7/1999 | Mori et al. ................ 296/187.12 |
| 6,729,639 | B2 |   | 5/2004 | Tomita |
| 7,104,596 | B2 | * | 9/2006 | Goto et al. ................ 296/193.07 |
| 7,237,833 | B1 | * | 7/2007 | Moll ............................. 296/204 |
| 7,461,890 | B2 | * | 12/2008 | Yatsuda ................... 296/203.02 |
| 7,560,003 | B2 | * | 7/2009 | Naughton et al. .............. 156/91 |
| 7,722,111 | B2 |   | 5/2010 | Reich et al. |
| 7,959,217 | B2 | * | 6/2011 | Onuma .................... 296/187.12 |
| 7,997,618 | B2 | * | 8/2011 | Hartmann et al. ............. 280/785 |
| 8,109,562 | B2 | * | 2/2012 | Yu ................................. 296/210 |
| 8,262,155 | B2 | * | 9/2012 | Leanza .......................... 296/205 |
| 2012/0126561 | A1 | * | 5/2012 | Pencak et al. ................. 296/24.3 |
| 2012/0126576 | A1 | * | 5/2012 | Pencak et al. ................. 296/191 |
| 2012/0126579 | A1 | * | 5/2012 | Pencak et al. ............ 296/193.07 |
| 2012/0305322 | A1 | * | 12/2012 | Schaal ........................ 180/65.1 |

FOREIGN PATENT DOCUMENTS

| | | |
|---|---|---|
| JP | 2001-247051 A | 9/2001 |
| JP | 2005-199918 A | 7/2005 |

* cited by examiner

*Primary Examiner* — Kiran B Patel
(74) *Attorney, Agent, or Firm* — Global IP Counselors, LLP

(57) ABSTRACT

A reinforced vehicle structure includes a vehicle panel, an elongated structural support member, and a support structure. The vehicle panel includes a first panel surface and a second panel surface, and defines a first opening that extends through the vehicle panel between the first and second panel surfaces. The elongated structural support member supports a portion of the first panel surface of the vehicle panel, and defines a first channel extending along the vehicle panel. The support structure is coupled to the structural support member at least partially within the first channel, includes a mounting structure that is aligned with the first opening in the vehicle panel, and defines a second channel extending transversely to the first channel of the structural support member.

20 Claims, 6 Drawing Sheets

REINFORCED VEHICLE STRUCTURE

CROSS-REFERENCE TO RELATED APPLICATIONS

Related subject matter is disclosed in U.S. patent application Ser. Nos. 12/950,717, 12/950,754 and 12/950,776, all filed on Nov. 19, 2010, the entire contents of each being incorporated herein by reference.

BACKGROUND

1. Field of the Invention

The present invention generally relates to a reinforced vehicle structure. More particularly, the present invention relates to a reinforced vehicle structure for securing a vehicle accessory, such as a shelving arrangement or D-ring, in a cargo area of a vehicle.

2. Background Information

Reinforcement components are often used in vehicles to increase the durability or rigidity of the vehicle body structure. For example, a reinforcement component may include an additional layer of material or a thickened component in an area where forces appear to be particularly concentrated, or in an area of particular importance where enhanced stress resistance is desired. Vehicle bodies are also sometimes manufactured to include prefabricated attachment points. Such attachment points may be utilized, for example, as tie-down locations in order to more reliably and efficiently secure cargo.

Prefabricated attachment points may also be included in a vehicle design to give customers the ability to add permanent custom equipment or components, which may be sold as dealer-installed accessories or added by aftermarket up-fitters. For example, such an attachment point may comprise a nut plate, which can include an accessible threaded aperture such as a nut that is welded to the opposite-facing side of a body panel. A D-ring attachment or shelf mounting structure, for example, can be coupled to the nut plate. However, the addition of equipment and components to vehicles after the vehicles leave the factory can impose increased stresses and fatigue on the vehicle body structures, which may not have been accounted for in the initial design of the vehicles. This is especially relevant at attachment points in the vehicle body structure, where forces imposed by equipment and components are often concentrated.

SUMMARY

In view of the state of the known technology, one aspect of the present invention is directed to various features of a reinforced vehicle structure including a vehicle panel, an elongated structural support member, and a support structure. The vehicle panel includes a first panel surface and a second panel surface, and defines a first opening that extends through the vehicle panel between the first and second panel surfaces. The elongated structural support member supports a portion of the first panel surface of the vehicle panel, and defines a first channel extending along the vehicle panel. The support structure is coupled to the structural support member at least partially within the first channel, includes a mounting structure that is aligned with the first opening in the vehicle panel, and defines a second channel extending transversely to the first channel of the structural support member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
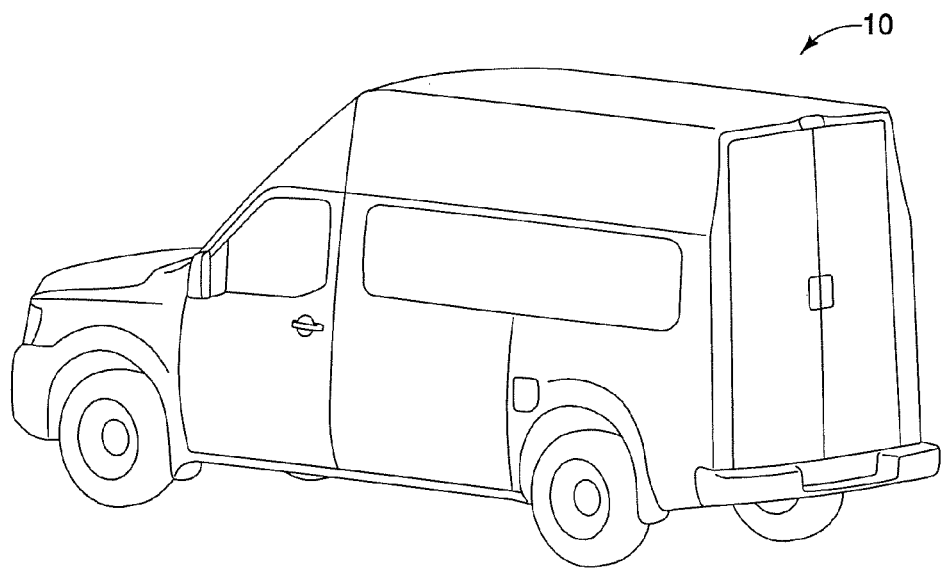
FIG. 1 is an exterior perspective view of a vehicle that has a reinforced vehicle structure in accordance with an illustrated embodiment.
Figure 2:
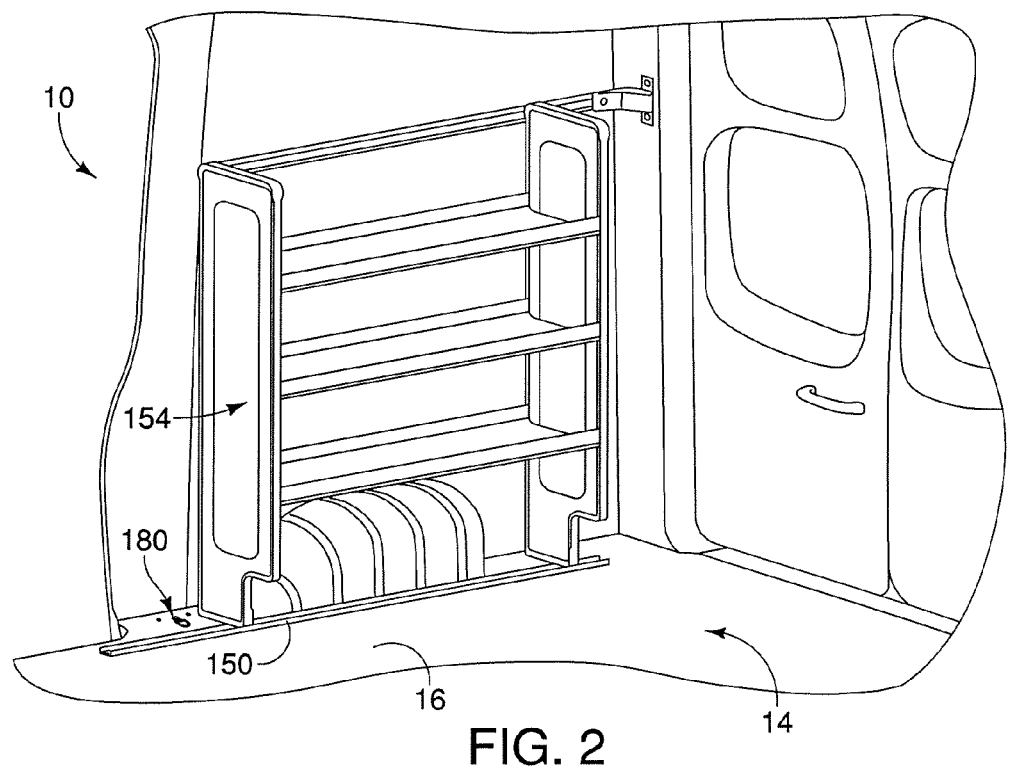
FIG. 2 is an interior perspective view of the rear passenger side of the vehicle illustrated in FIG. 1.
Figure 3:
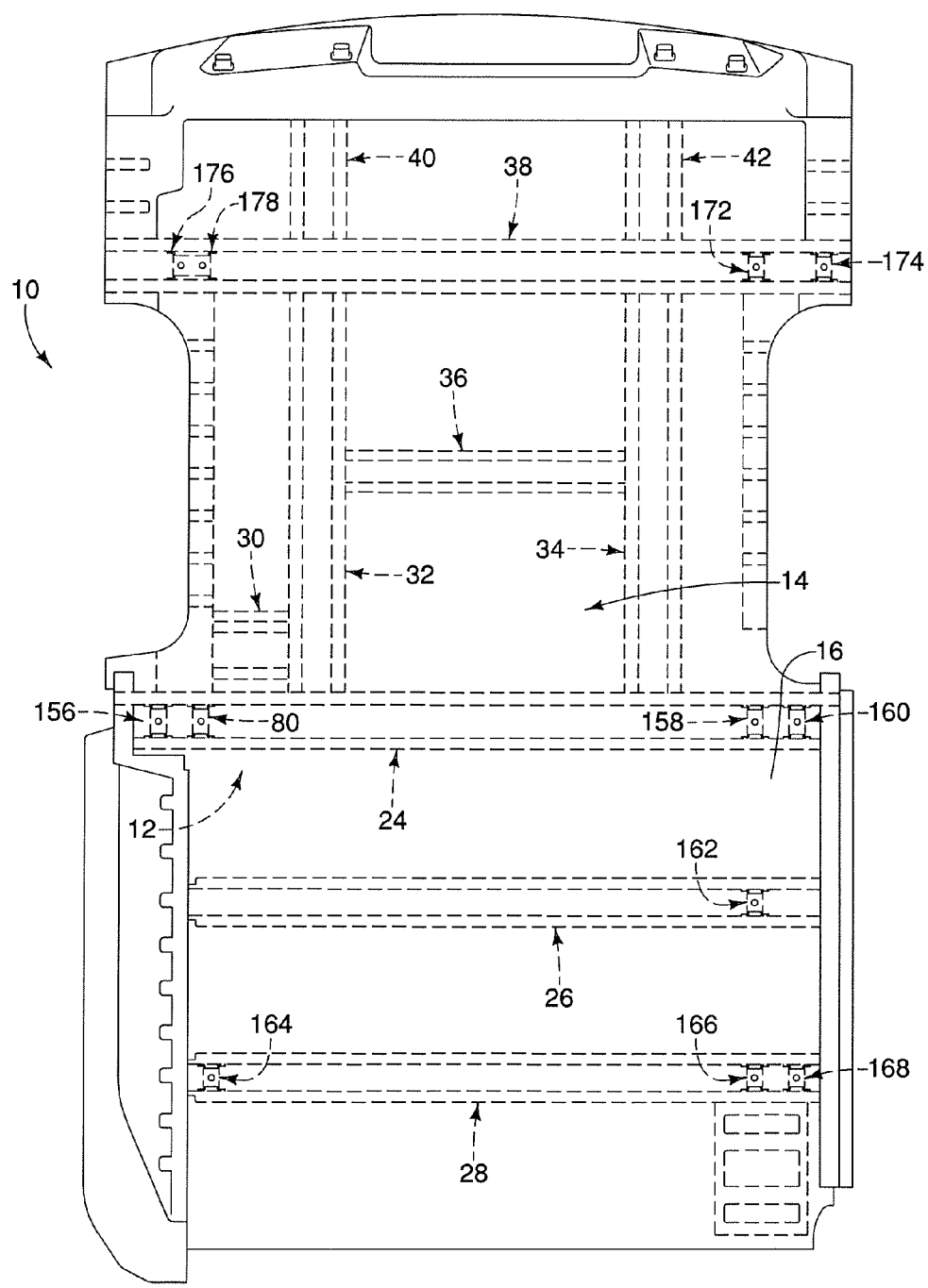
FIG. 3 is a plan view of the floor of the vehicle particularly illustrating an example of the reinforced vehicle structure mounted in the vehicle.

Referring initially to FIGS. 1-3, a vehicle 10 includes a reinforced vehicle structure 12. The reinforced vehicle structure 12 in this example is configured in the cargo compartment 14 of the vehicle 10. However, the reinforced vehicle structure 12 can be present at any other suitable location within the interior of the vehicle 10.

As shown in FIGS. 1-5 and 8, the reinforced vehicle structure 12 in this example includes a vehicle panel 16, such as a vehicle floor. However, the vehicle panel 16 can be any other suitable panel of the vehicle 10, such as a wall panel, door panel or roof panel. The vehicle panel 16 has an outer wall surface 18 (FIG. 8), which can be referred to as an underbody floor surface or first panel surface that faces an exterior of the vehicle 10. The vehicle panel 16 further has an inner wall surface 20, which can be referred to as an interior floor surface or second panel surface that faces an interior of the vehicle 10, such as toward the cargo compartment 14. The vehicle panel 16 is made of a metal typically used in automotive manufacture or any other suitable material. The vehicle panel 16 further defines at least one first opening 22 (FIG. 8) that extends through the vehicle panel 16 between the outer wall surface 18 and the inner wall surface 20.

The reinforced vehicle structure 12 further includes at least one elongated structural support member 24 that supports a portion of the outer wall surface 18 of the vehicle panel 16. In this example, the reinforced vehicle structure 12 includes a plurality of structural support members 24 through 42, which support respective portions of the outer wall surface 18 as shown. For purposes of this example, structural support member 24 will be discussed in detail. However, each of the structural support members 24 through 42 can have the same or substantially the same cross-sectional configuration, and can have different longitudinal lengths as illustrated.

The structural support member 24 in this example is a floor cross-member that extends in a lateral direction of the vehicle 10. The structural support member 24, as well as the other structural support members 26 through 42, can be mounted to outer wall surface 18 by welding, riveting, screws, or any other suitable fastening means. The structural support members 26-42 can further be mounted to other portions of the body of vehicle 10, such as the vehicle frame, by welding, riveting, screws, or any other suitable fastening means. The structural support members 24 through 42 are also made of a metal that can be the same as the metal of vehicle panel 16, or any other suitable metal or material.

As shown in more detail in FIGS. 5-9, the structural support member 24 defines a first channel 44 extending along the vehicle panel 16. In this example, the structural support member 24 includes a beam member 46 and a brace member 48 that is fixed to and overlays at least a portion of the beam member 46. Specifically, the brace member 48 is received in the first channel 44 and mates with the beam member 46. Thus, the brace member 48 substantially conforms to an overall shape of the beam member 46 to at least partially define the first channel 44. The brace member 48 can be fixedly mounted to the beam member 46 by welding, riveting, screws, or any other suitable fastening means. Also, the beam member 46 and brace member 48 can be made of a metal that can be the same as the metal of vehicle panel 16, or any other suitable metal or material, and can be made of the same materials or different materials. Furthermore, the brace member 48 can extend along any length of the beam member 46, and a plurality of brace members 48 can be mounted to the beam member 46. Also, the brace member 48 can be made integral with the beam member 46.

The first channel 44 of the structural support member 24 is defined by an elongated base portion 50 and a pair of side wall portions 52 and 54 that extend perpendicularly or substantially perpendicularly from respective opposite longitudinal edges 56 and 58 of the elongated base portion 50 to define a generally U-shaped cross-sectional profile. The elongated base portion 50 can solely include a base portion 60 of the beam member 46, or both a base portion 60 of the beam member 46 and a base portion 62 of the brace member 48. Side wall portion 52 can solely include a side wall portion 64 of the beam member 46, or both a side wall portion 64 of the beam member 46 and a side wall portion 66 of the brace member 48. Similarly, side wall portion 54 can solely include a side wall portion 68 of the beam member 46, or both a side wall portion 68 of the beam member 46 and a side wall portion 70 of the brace member 48.

Naturally, the side wall portions 52 and 54 can extend at any suitable angle with respect to the elongated base portion 50 to define a corresponding cross-sectional profile. As further illustrated, mounting flanges 72 and 74 extend from the side wall portions 52 and 54, respectively. The mounting flanges 72 and 74 can extend perpendicular or substantially perpendicular to their respective side wall portions 52 and 54, or at any other suitable angle with respect to the side wall portions 52 and 54. Thus, the upper surfaces 76 and 78 of the mounting flanges 72 and 74 can extend parallel or substantially parallel to the outer wall surface 18 of the vehicle panel 16, and contact the outer wall surface 18 of the vehicle panel 16 when the structural support member 24 is mounted to the outer wall surface 18 of the vehicle panel 16. Also, the mounting flanges 72 and 74 can be fixedly mounted to the outer wall surface 18 by welding, riveting, screws, or any other suitable fastening means to secure or at least assist in securing the structural support member 24 to the outer wall surface 18. In this example, the mounting flanges 72 and 74 extend from the beam member 46. However, the structural support member 24 can be configured such that the mounting flanges 72 and 74 instead extend from the brace member 48, or from both the beam member 46 and the brace member 48.

As further illustrated, the reinforced vehicle structure 12 includes a support structure 80 that is coupled to the structural support member 24 at least partially within the first channel 44. In this configuration, the support structure 80 is positioned such that the brace member 48 is disposed between the support structure 80 and the structural support member 24. As further shown, the support structure 80 defines a second channel 82 that extends transversely to the first channel 44 of the structural support member 24. For example, the second channel 82 can extend perpendicular or substantially perpendicular to the first channel 44, or at any other suitable angle relative to the first channel 44.

The support structure 80 can include a bracket member 84 and a brace member 86 that is fixed to and overlays at least a portion of the bracket member 84. The brace member 86 substantially conforms to an overall shape of the bracket member 84 to at least partially define the second channel 82 such that the bracket member 84 is disposed between the vehicle panel 16 and the brace member 86. The brace member 86 can be fixedly secured to the bracket member 84 by welding, riveting, screws, or any other suitable fastening means. Also, the bracket member 84 and brace member 86 can be made of a metal that can be the same as the metal of vehicle panel 16, or any other suitable metal or material, and can be made of the same materials or different materials. Furthermore, the brace member 86 can extend along any length of the bracket member 84, and a plurality of brace members 86 can be mounted to the bracket member 84. Also, the brace member 86 can be made integral with the bracket member 84.

Also, the structural support member 24 and the support structure 80 are arranged with respect to each other such that the second channel 82 is open in a direction facing the first channel 44. Specifically, in this arrangement, the first channel 44 opens in a direction toward the outer wall surface 18 (first panel surface) of the vehicle panel 16 and the second channel 82 opens in a direction away from the outer wall surface 18 of the vehicle panel 16.

As further illustrated, the second channel 82 of the support structure 80 is defined by a central portion 88 and a pair of side portions 90 and 92 extending perpendicularly from respective opposite longitudinal edges 94 and 96 of the central portion 88 to define a generally U-shaped cross-sectional profile. Naturally, the side portions 90 and 92 can extend at any suitable angle with respect to the central portion 88 to define a corresponding cross-sectional profile. The central portion 88 can solely include a base portion 98 of the bracket member 84, or both a base portion 98 of the bracket member 84 and a base portion 100 of the brace member 86. Side portion 90 can solely include a side portion 102 of the bracket member 84, or both a side portion 102 of the bracket member 84 and a side portion 104 of the brace member 86. Similarly, side portion 92 can solely include a side portion 106 of the bracket member 84, or both a side portion 106 of the bracket member 84 and a side portion 108 of the brace member 86. Furthermore, the support structure 80 has opposite open ends 110 and 112 that face respective side wall portions 52 and 54 in the first channel 44 of the structural support member 24.

In addition, a first coupling flange 114 extends from a first end edge 116 of the support structure 80, and a second coupling flange 118 extends from a second end edge 120 of the support structure 80 that is opposite the first end edge 116. In this example, the first and second coupling flanges 114 and 118 of the support structure extend perpendicularly or substantially perpendicularly from respective ones of the pair of side portions 90 and 92 such that the first and second coupling flanges 114 and 118 extend in a longitudinal direction of the structural support member 24. Naturally, the first and second coupling flanges 114 and 118 of the support structure can extend at any suitable angle from respective ones of the pair of side portions 90 and 92. Each of the first and second coupling flanges 114 and 118 are rigidly fixed to the structural support member 24 by welding, riveting, screws, or any other suitable fastening means.

The support structure 80 can further include a third coupling flange 122 that extends from a third end edge 124 of the support structure 80, and a fourth coupling flange 126 that extends from a fourth end edge 128 of the support structure 80 that is opposite the third end edge 124. The third and fourth coupling flanges 122 and 126 can be configured similar to the first and second coupling flanges 114 and 118 as discussed above, and can be rigidly fixed to the structural support member 24 as discussed above. In this example, the first and second coupling flanges 114 and 118, as well as the third and fourth coupling flanges 122 and 126, extend from the bracket member 84 of the support structure 80. However, the first, second, third and fourth coupling flanges 114, 118, 122 and 126 can alternatively extend from the brace member 86, or both the bracket member 84 and the brace member 86.

As further shown, the lower surface 130 of the base portion 100 of the brace member 86 defines a base portion of the second channel 82 of the support structure 80. The base portion of the second channel 82 is aligned with or substantially aligned with distal longitudinal edges 132 and 134 of the pair of side wall portions 52 and 54 of the structural support member 24 such that the support structure 80 abuts the outer surface (first surface) 18 of the vehicle panel 16. Also, the brace member 48 can include a raised portion 136 that extends toward the vehicle panel 16 and is adjacent to the second channel 82. The beam member 46 can also include a raised portion 138 that is aligned with or substantially aligned with the raised portion 136 and extends toward the vehicle panel 16 as shown.

The support structure 80 further includes a mounting structure 140 that is aligned with or substantially aligned with the first opening 22 in the vehicle panel 16. In this example, the mounting structure 140 can include a nut 142 that is secured to the lower surface 130 of the base portion 100 of the brace member 86 by welding, adhesives or in any other suitable manner. The nut 142 of mounting structure 140 has a threaded opening 144 that is aligned with or substantially aligned with an opening 146 defined in the bracket member 84 and an opening 148 defined in the brace member 86. Accordingly, the support structure 80 is positioned in the first channel 44 such that the opening 146 defined in the bracket member 84 aligns with or substantially aligns with the first opening 22 in the vehicle panel 16.

Also, since the structural support member 24 is mounted to the outer wall surface 18 of the vehicle panel 16, the support structure 80 is located proximate to the outer wall surface 18. Hence, the support structure 80 in this example is spaced apart from the base portion 50 of the structural support member 24. However, the support structure 80 can instead extend along the depth of the first channel 44 so that the support structure 80 contacts the base portion 50. Also, if the support structure 80 is located within the first channel 44 above a brace member 48, the support structure 80 can extend along the depth of the first channel 44 so that the support structure 80 contacts the brace member 48. In addition, the opening 22 in the vehicle panel 16 can be of sufficient size to permit an upper portion of the support structure 80, and thus the mounting structure 140, to be at least partially disposed at the inner wall surface 20 of the vehicle panel 16.

As further shown in FIGS. 2, 4, 5 and 8, for example, an accessory attachment member 150 is mounted to the inner wall surface 20 (second panel surface) of the vehicle panel 16 and coupled to the mounting structure 140. Specifically, a coupling member 152, such as a screw, can be threadedly received in the opening 142 of the mounting structure 140 and thus secure the accessory attachment member 150 to the support structure 80. In this example, the accessory attachment member 150 can be made of a metal, such as that of vehicle floor 16 or reinforcement member 24, or any other suitable metal or material, and can be used, for example, to secure shelving 154 in the cargo compartment 14 of the vehicle 10. Naturally, the coupling member 152 can couple the accessory attachment member 150 to the mounting structure 140 when the mounting structure 140 is at least partially disposed at the inner wall surface 20 (second panel surface) of the vehicle panel 16. Further details of exemplary accessory attachment members 150 and shelving 154 are described in U.S. patent application Ser. Nos. 12/950,717, 12/950,754, and 12/950,776 referenced above.

In addition, as shown in FIGS. 3 and 5-7, a second support structure 156, identical to or at least similar to support structure 80 as discussed above, can be coupled to the structural support member 24 and spaced along the first channel 44 of the structural support member 24 at a distance from support structure 80. FIG. 3 further illustrates that a plurality of additional support structures 158 through 178, that are identical to or at least similar to support structure 80 as discussed above, can be coupled to the structural support members 24 through 42 and spaced along the first channels 44 of those structural support members 24 through 42.

Figure 4:
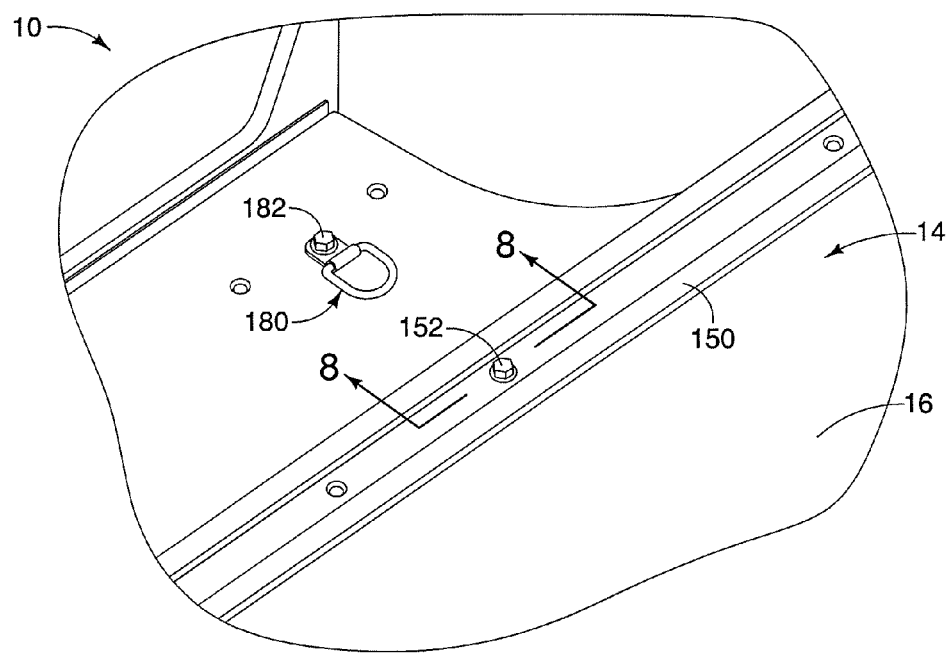
FIG. 4 is a detailed interior perspective view of the rear passenger side of the vehicle illustrated in FIG. 2 showing an accessory attachment member and a D-ring mounted in the vehicle.
Figure 5:
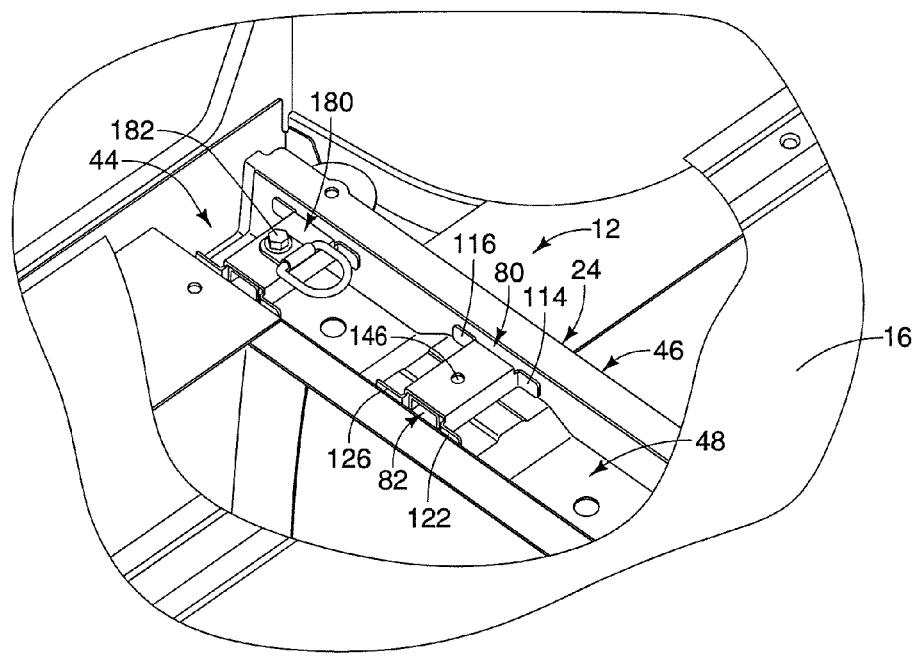
FIG. 5 is a detailed interior perspective view of the rear passenger side of the vehicle illustrated in FIG. 2 with a portion of the vehicle floor panel removed to show further details of the reinforced vehicle structure mounted in the vehicle.
Figure 6:
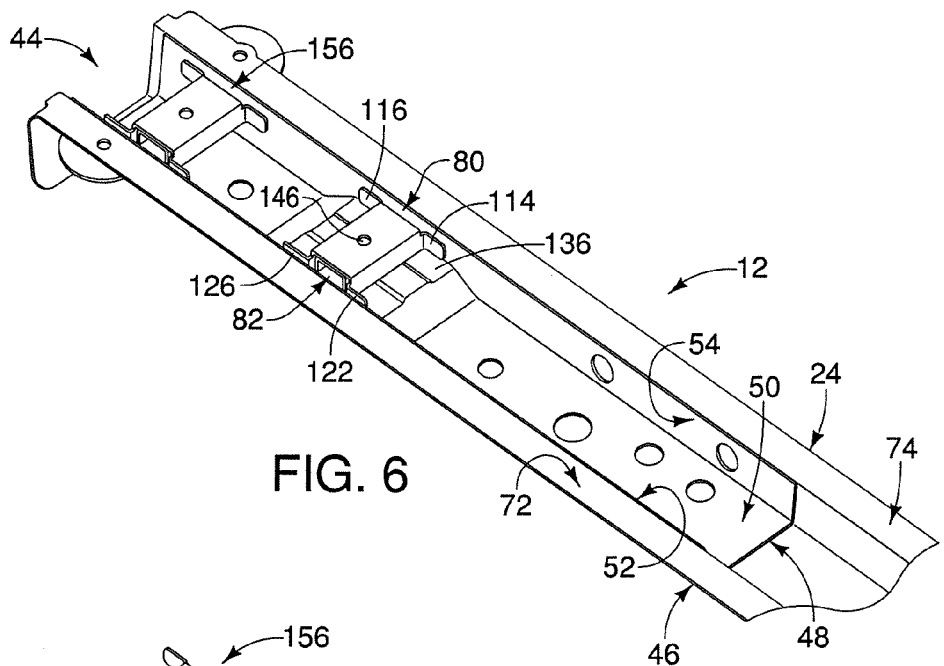
FIG. 6 is a detailed perspective view of a portion of the reinforced vehicle structure mounted in the vehicle.
Figure 7:
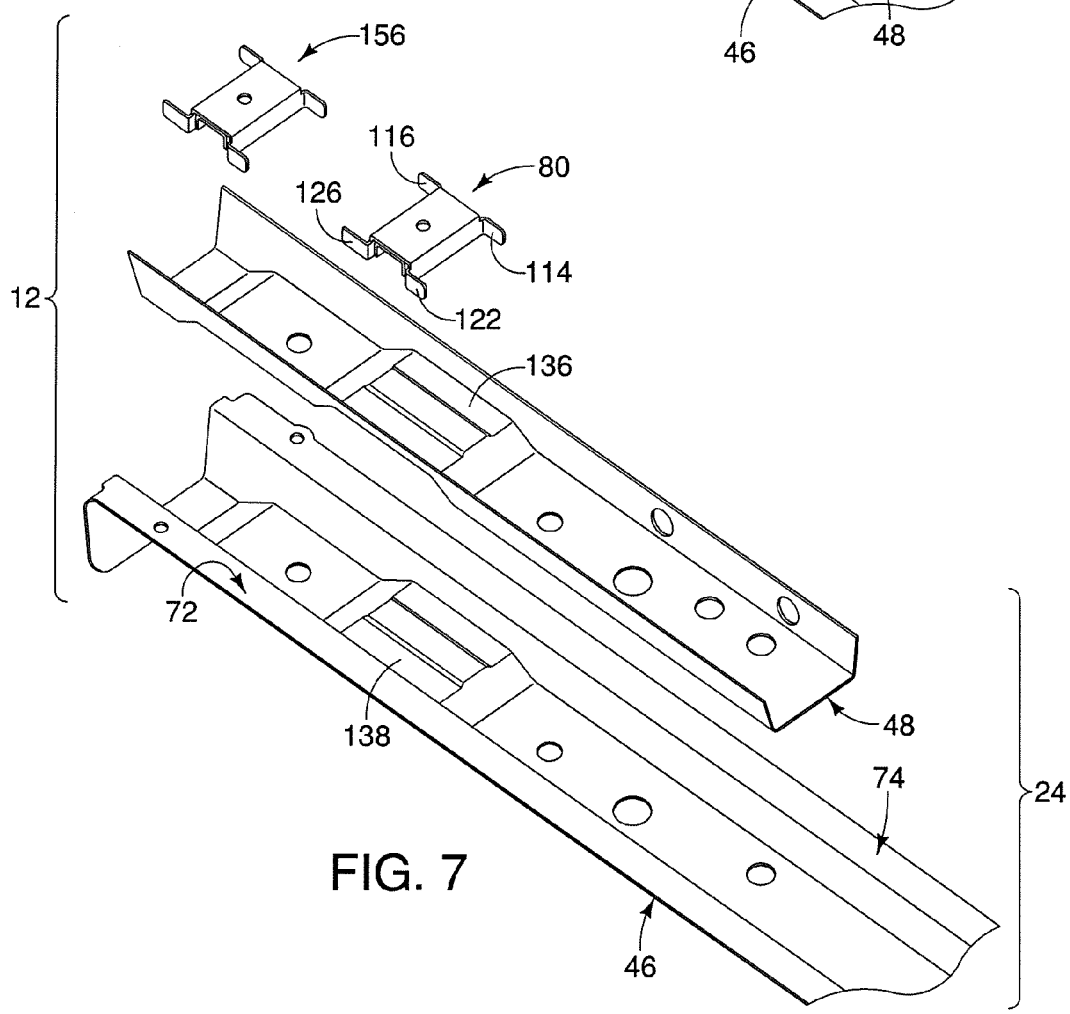
FIG. 7 is an exploded perspective view of the portion of the reinforced vehicle structure shown in FIG. 6.
Figure 8:
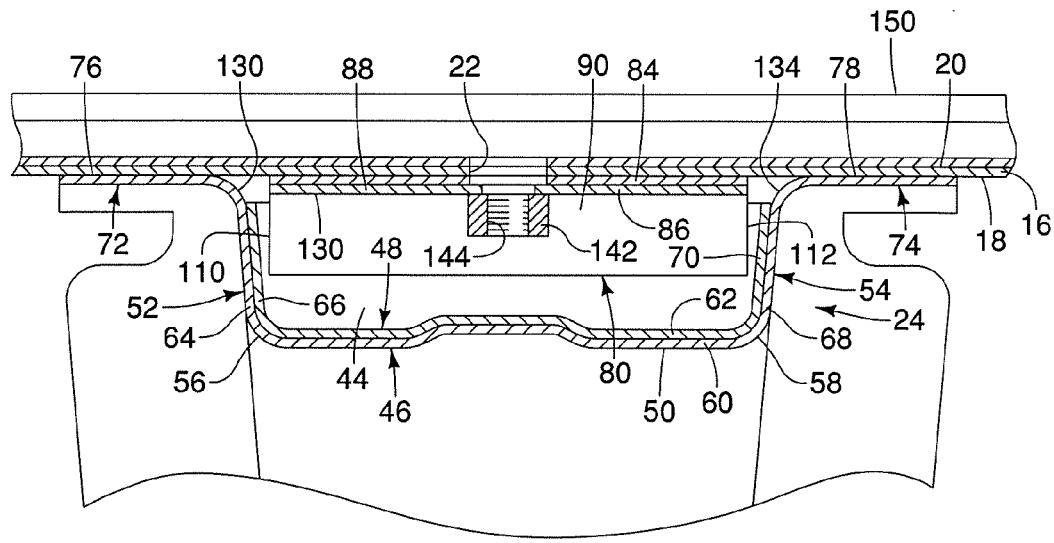
FIG. 8 is a cross-sectional view taken along lines 8-8 in FIG. 4.
Figure 9:
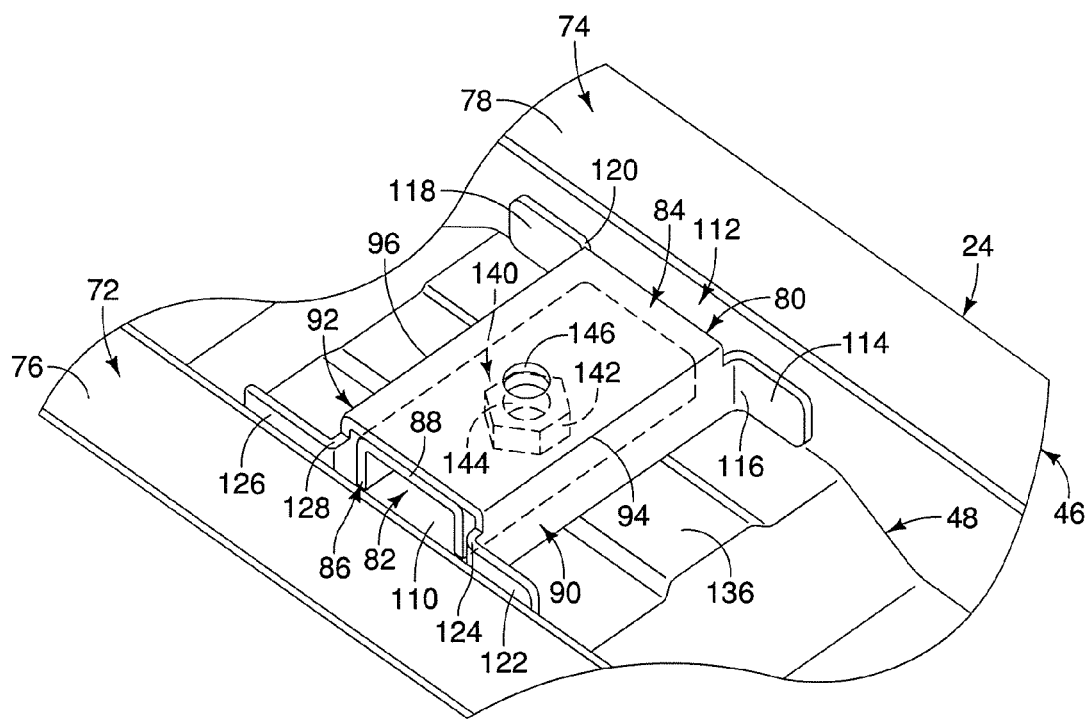
FIG. 9 is a detailed perspective view of a support structure mounted in an elongated structural support member of the reinforced vehicle structure.
Figure 10:
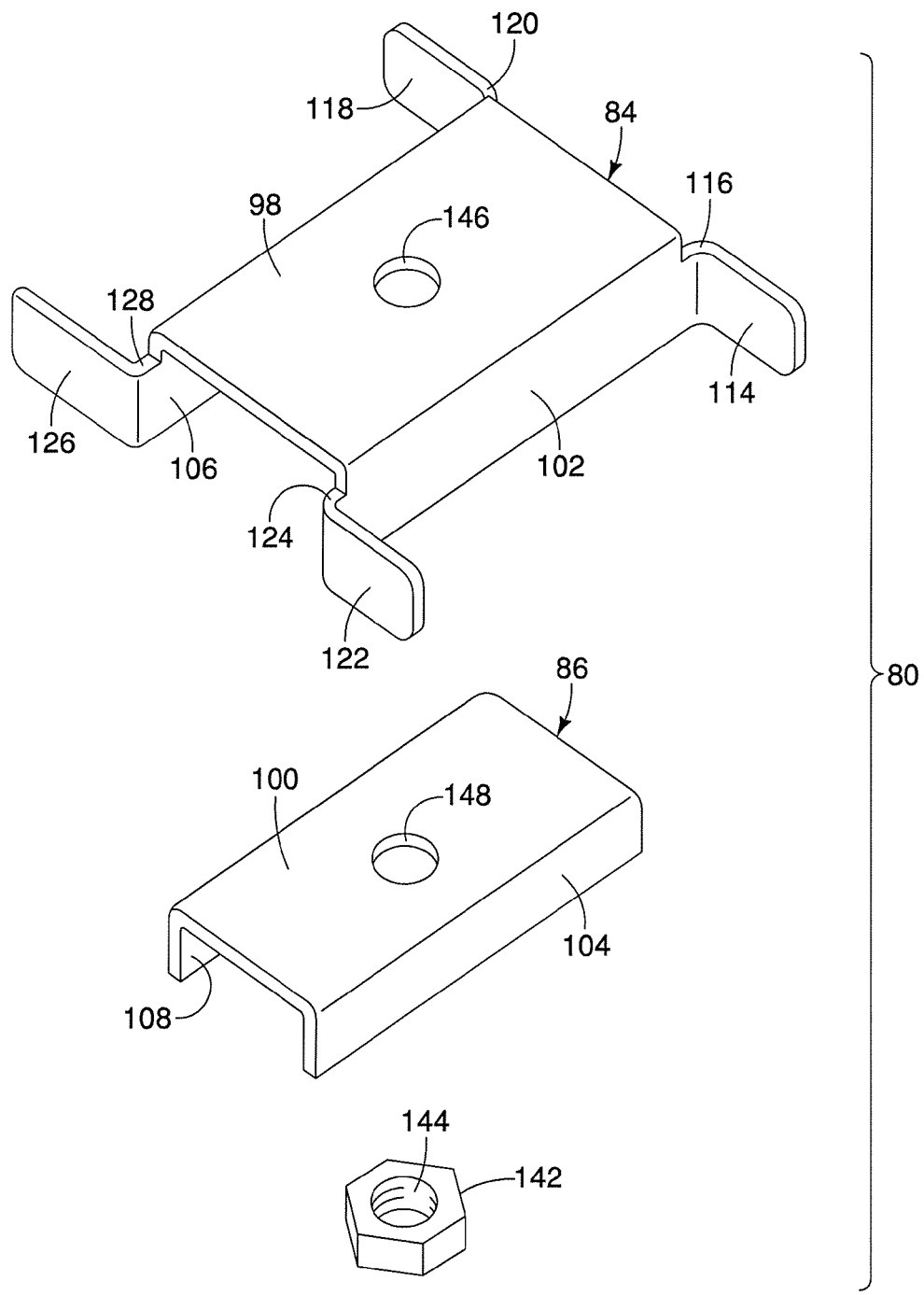
FIG. 10 is an exploded perspective view of the support structure shown in FIG. 9.

In addition, as shown in FIGS. 2, 4 and 5, a second accessory attachment member 180 can include, for example, a D-ring. The second accessory attachment member 180 further includes a coupling member 182, such as a screw, can be threadedly received in the opening 142 of the mounting structure 140 and thus secure the second accessory attachment member 180 to the second support structure 156. In this example, the second accessory attachment member 180 can be made of a metal, such as that of vehicle floor 16 or reinforced vehicle structure 12, or any other suitable metal or material, and can be used, for example, to secure an object in the cargo compartment 14 of the vehicle 10. Naturally, the coupling member 182 can couple the second accessory attachment member 180 to the mounting structure 140 of the second support structure 156 when the mounting structure 140 is at least partially disposed at the inner wall surface 20 (second panel surface) of the vehicle panel 16.

As can be appreciated from the above, the reinforced vehicle structure 12 can distribute a force, such as a pulling force, that is imposed on an accessory attachment member, such as accessory attachment member 150 or second accessory attachment member 178, better than a single nut plate that is simply attached to the vehicle panel 16. Accordingly, the reinforced vehicle structure 12 more rigidly attaches the accessory attachment member 150 and second accessory attachment member 178 to the vehicle 10 in a secure manner.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiments, the following directional terms "forward", "rearward", "above", "downward", "vertical", "horizontal", "below" and "transverse" as well as any other similar directional terms refer to those directions of a vehicle equipped with the reinforced vehicle structure. Accordingly, these terms, as utilized to describe the present invention should be interpreted relative to a vehicle equipped with the reinforced vehicle structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments of the present invention are provided for illustration only, and not for the purpose of limiting the invention as defined by the appended claims and their equivalents.

What is claimed is:

1. A reinforced vehicle structure comprising:
    a vehicle panel including a first panel surface and a second panel surface, the vehicle panel defining a first opening that extends through the vehicle panel between the first and second panel surfaces;
    an elongated structural support member supporting a portion of the first panel surface of the vehicle panel, the structural support member defining a first channel extending along the vehicle panel; and
    a support structure coupled to the structural support member at least partially within the first channel, the support structure including a mounting structure that is aligned with the first opening in the vehicle panel, the support structure defining a second channel extending transversely to the first channel of the structural support member.

2. The reinforced vehicle structure according to claim 1, wherein
    the support structure has opposite open ends that face respective side walls in the first channel of the structural support member.

3. The reinforced vehicle structure according to claim 1, wherein
    the second channel of the support structure is defined by a central portion and a pair of side portions extending perpendicularly from respective opposite longitudinal edges of the central portion to define a generally U-shaped cross-sectional profile, with a first coupling flange extending from a first end edge of the support structure and a second coupling flange extending from a second end edge of the support structure that is opposite the first end edge, each of the first and second coupling flanges being rigidly fixed to the structural support member.

4. The reinforced vehicle structure according to claim 1, wherein
    the first channel of the structural support member is defined by an elongated base portion and a pair of side wall portions extending perpendicularly from respective opposite longitudinal edges of the elongated base portion to define a generally U-shaped cross-sectional profile.

5. The reinforced vehicle structure according to claim 1, wherein
    the structural support member and the support structure are arranged with respect to each other such that the second channel is open in a direction facing the first channel.

6. The reinforced vehicle structure according to claim 1, further comprising
    an accessory attachment member mounted to the second panel surface of the vehicle panel and coupled to the mounting structure.

7. The reinforced vehicle structure according to claim 1, wherein
    the first panel surface of the vehicle panel forms a portion of an outer wall surface that faces an exterior of a vehicle including the reinforced vehicle structure;
    the second panel surface of the vehicle panel forms a portion of an inner wall surface that faces an interior of the vehicle; and
    the structural support member is mounted to the outer wall surface of the vehicle panel and the support structure is located proximate to the outer wall surface.

8. The reinforced vehicle structure according to claim 7, further comprising
    an accessory attachment member coupled to the mounting structure that is at least partially disposed at the second panel surface of the vehicle panel.

9. The reinforced vehicle structure according to claim 1, wherein
    the first channel opens in a direction toward the first panel surface of the vehicle panel and the second channel opens in a direction away from the first panel surface of the vehicle panel.

10. The reinforced vehicle structure according to claim 1, further comprising
    a plurality of the support structures coupled to the structural support member and spaced along the first channel of the structural support member.

11. The reinforced vehicle structure according to claim 3, wherein
    the support structure includes a bracket member and a brace member that is fixed to and overlays at least a portion of the bracket member.

12. The reinforced vehicle structure according to claim 11, wherein
    the brace member substantially conforms to an overall shape of the bracket member to at least partially define the second channel such that the bracket member is disposed between the vehicle panel and the brace member.

13. The reinforced vehicle structure according to claim 12, wherein
    the first and second coupling flanges extend from the bracket member of the support structure.

14. The reinforced vehicle structure according to claim 4, wherein
the structural support member includes a beam member and a brace member that is fixed to and overlays at least a portion of the beam member.

15. The reinforced vehicle structure according to claim 14, wherein
the brace member substantially conforms to an overall shape of the beam member to at least partially define the first channel such that the brace member is disposed between the support structure and the structural support member.

16. The reinforced vehicle structure according to claim 15, wherein
the brace member includes a raised portion extending toward the vehicle panel and adjacent to the second channel.

17. The reinforced vehicle structure according to claim 4, wherein
a base portion of the second channel of the support structure is aligned with distal longitudinal edges of the pair of side wall portions of the structural support member such that the support structure abuts the first surface of the vehicle panel.

18. The reinforced vehicle structure according to claim 4, wherein
the support structure is spaced apart from the base portion of the structural support member.

19. The reinforced vehicle structure according to claim 1, wherein
the structural support member is a floor cross-member that extends in a lateral direction of a vehicle including the reinforced vehicle structure.

20. The reinforced vehicle structure according to claim 1, wherein
the first and second coupling flanges of the support structure extend perpendicularly from respective ones of the pair of side portions such that the first and second coupling flanges extend in a longitudinal direction of the structural support member.

* * * * *